Sept. 4, 1923.                                                                                           1,467,055
                                    A. J. MICHELIN
                       AUTOMATIC ALARM FOR PARTIALLY DEFLATED TIRES
                          Filed Oct. 18, 1922          2 Sheets—Sheet 1
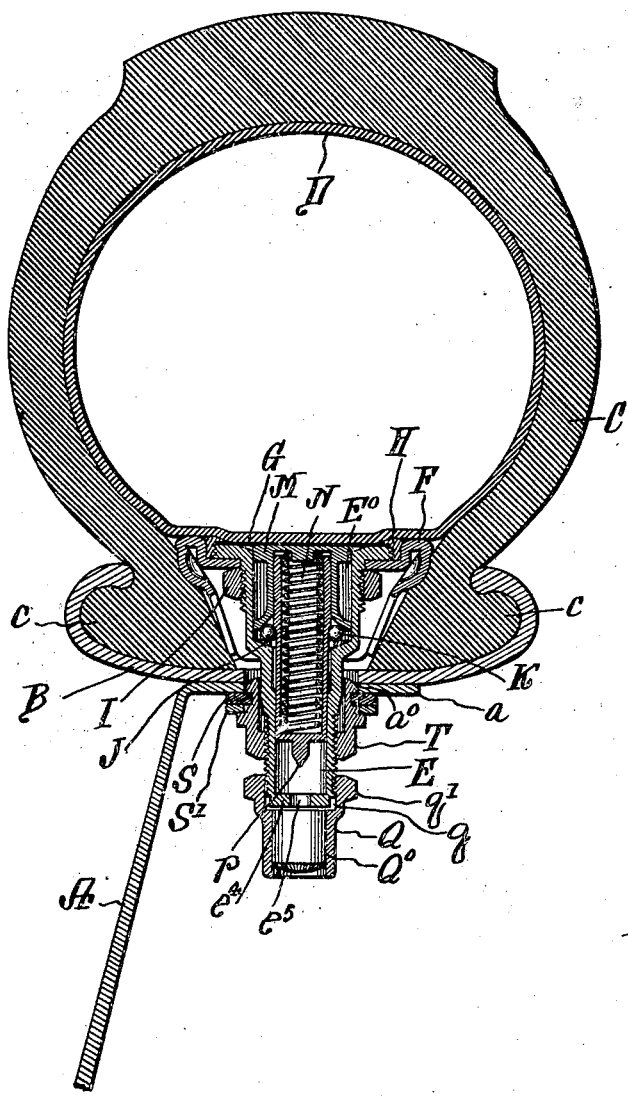
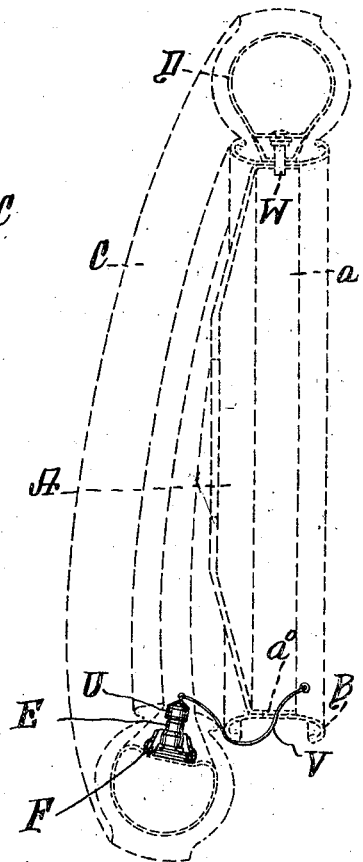
Inventor
André J. Michelin
by Wilkinson & Giusta
Attorneys.

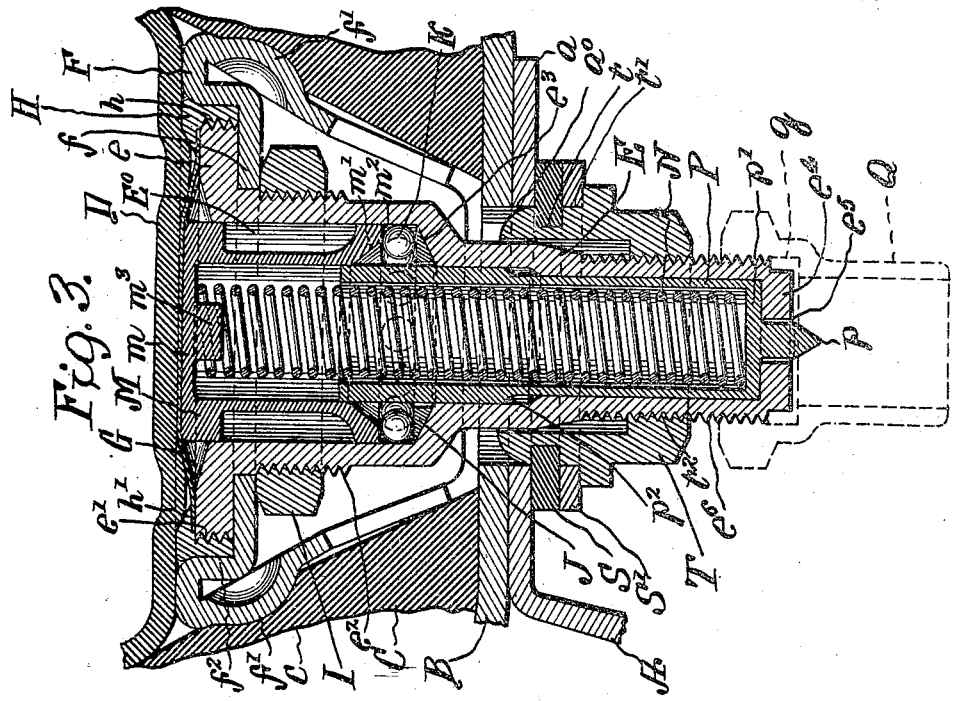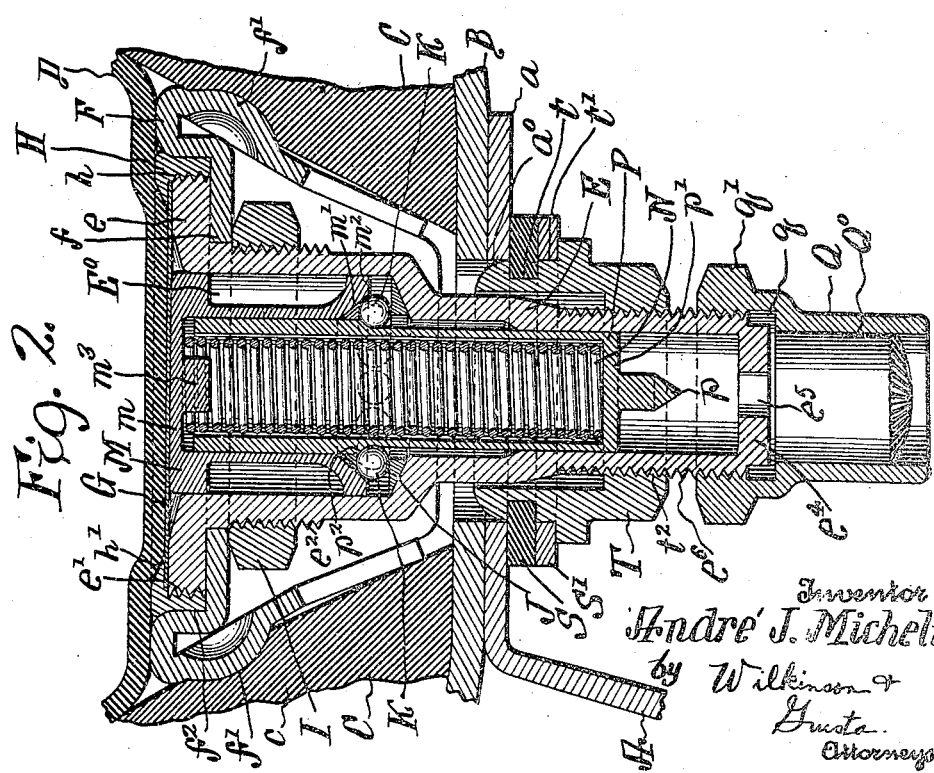

Patented Sept. 4, 1923.

1,467,055

UNITED STATES PATENT OFFICE.

ANDRÉ JULES MICHELIN, OF PARIS, FRANCE.

AUTOMATIC ALARM FOR PARTIALLY-DEFLATED TIRES.

Application filed October 18, 1922. Serial No. 595,390.

*To all whom it may concern:*

Be it known that I, ANDRÉ JULES MICHELIN, a citizen of the French Republic, residing at Paris, France, have invented certain new and useful Improvements in Automatic Alarms for Partially-Deflated Tires; and I do hereby declare the following to be a full, clear, and exact description of the invention, such as will enable others skilled in the art to which it appertains to make and use the same.

My present invention relates to improvements in apparatus for warning the chauffeur or driver of a vehicle provided with pneumatic tires when the pressure of the air in the inner tube of said tire falls below normal, and prior to the complete deflation of the tire. In other words it is intended to provide automatically operated apparatus which will advise the chauffeur, not when the tire is down, but when the pressure in the tire is so low as to threaten injurious effects at an early date but before such injurious effects take place.

In such an apparatus it is desirable to provide compact, light and efficient apparatus which is not likely to be in the way of the other parts of the mechanism, and which will not be conspicious or interfere in any way with the æsthetic appearance of the wheel to which it is attached. By the arrangement hereinafter described the automatic alarm attachment is made of generally similar shape and appearance to the valve casing and attachments used in charging the inner tube with compressed air, and by placing the attachment opposite the said valve casing, symmetry of parts is secured and the appearance of the wheel is in no way marred.

The invention relates primarily to an apparatus arranged to fire a cartridge, which is operated when the pressure in the inner tube falls below a predetermined limit.

My invention relates especially to improvements on the device shown in my U. S. Patent No. 1,367,490, granted February 1, 1921, and entitled Automatic alarm for partially deflated tires.

The improvements referred to not only diminish the cost of manufacture, but increase the sensitiveness of the device and eliminate the cause of irregularity in operation, resulting from the inequalities in the space between the edges of the beads of the tire, which space varies for each size of pneumatic tire. In the patent referred to the element actuated by the pressure of the air tube, which causes the release of the percussion member, is placed between the edges of the beads adjacent to the rim; while in the present invention this element is mounted above the beads further inside the casing of the tire, and the device is held in place by means of a steel plate provided with notches to engage on the inner face of the tire casing and hold the parts securely in place.

Furthermore, the present invention simplifies the spring arrangement of the patent referred to, and employs a single spring which serves simultaneously to balance the pneumatic pressure on the interior of the inner tube, and to force the percussion member against the cartridge, thereby causing the cartridge to explode when the pneumatic pressure in the inner tube falls below a safety limit.

For practical purposes, the safety limit may be defined as 2 kilograms, or about $4\frac{4}{10}$ pounds of pneumatic pressure to the square inch.

These and the various other features of my present invention will be hereinafter more fully described and claimed.

My invention will be more fully understood after reference to the accompanying drawings, in which like parts are indicated by similar reference symbols throughout the several views, and in which:—

Figure 1 shows a cross section through the rim and tire, and though the apparatus for giving the alarm, and shows the apparatus in the armed or cocked position.

Figure 2 is a detail view, on a larger scale, of the alarm apparatus shown in Fig. 1, showing the same section as in said figure; the parts being shown in the armed or cocked position as in Fig. 1.

Figure 3 is a similar view to Fig. 2, but shows the parts in the position assumed when the arm is operated and the cartridge has been fired; and Figure 4 shows the method of mounting the inflated tire having the alarm connected thereto on the rim of the wheel. the rim and tire being shown in dotted lines, and the alarm attachment being shown in full lines.

A represents the wheel body which is shown as of the disk wheel type, flanged as at $a$, and having said flange perforated as at $a^0$.

B represents the rim which may be of any suitable type, but is shown in Fig. 1 as of the clincher type.

C represents the tire casing, and D the inner or pneumatic tube which is inflated in the usual way.

E represents the body portion or housing of the alarm attachment which is hollowed as shown, and is provided with a flanged head $e$ to engage the annular portion $f$ of the clamp piece F, which is preferably made in the form of a basket open top and bottom, and is provided with a series of outwardly-projecting bosses $f'$ adapted to engage the bead $c$ of the tire casing C, as will be hereinafter more fully described.

The head of the clamp piece F is provided with an annular chamber $f^2$ in which the clamping ring H is mounted, which ring is screw-threaded, as at $h$, to engage the screw threads $e'$ on the clamp piece; and the said ring is provided with an overhanging rib $h'$ adapted to engage and firmly hold in place the diaphragm G. This diaphragm may be made of thin metal, or other suitable material which will yield slightly under treatment, but will return to the normal position when the pressure is released.

The body portion E is exteriorly screw threaded, as at $e^2$, to engage the clamp nut I which bears against the part $f$ of the clamp piece F, and this nut holds the body portion firmly in the clamped piece. The body portion E is provided with a chamber $E^0$, with a tapered base $e^3$, above which is mounted the wedge-shaped ring J, the bottom of which ring is so shaped that the top of the ring will lie in a plane at right angles to the axis of the housing.

K represents a series of balls, arranged as a crown, normally held between the ring J and the cup-shaped cap or bell M, whose head $m$ is normally pressed outwards under the action of the pneumatic pressure in the inner tube D. This bell M is provided at its outer or open end with an annular tapered chamber $m'$ terminating in the plane face $m^2$, parallel to the adjacent face of the ring J.

This bell M may also be provided with an inwardly projecting lug $m^3$ which projects into the coil spring N. This coil spring is held under compression in the tubular plunger P, having the firing pin $p$ projecting from its closed end $p'$. The opposite end of the plunger is open to permit the insertion and operation of the spring N. The exterior of this plunger is provided towards its open end with a tapered shoulder $p^2$ adapted to engage the balls K and wedge the same outward when the plunger is in the armed or cocked position shown in Fig. 2.

The housing E has its outer end $e^4$ perforated as at $e^5$ to permit the passage of the firing pin $p$. The said housing is also screw threaded near its outer end as at $e^6$.

Q represents the cartridge holder which is provided with a bore $Q^0$ to receive the cartridge, and with a recess $q$ to receive the outer end of the housing E to which the cartridge holder is attached. The cartridge holder is enlarged, as at $q'$, for convenience in manipulation, and is screwed on the housing, as shown in detail in Fig. 2.

S represents a gasket of rubber or other suitable material which fits in a notch $t$ in the nut T. This nut is provided with an annular rib $t'$ which bears against the metal washer $S'$ exterior to the gasket S. The nut T is provided with internal screw threads $t^2$ to engage the screw threads $e^6$ on the housing E.

When the parts are in the assembled position shown in Figs. 2 and 3 the housing is drawn outwards by turning on the nut T causing the bosses $f'$ of the clamp piece F to press outward on the tire casing and clamp the same between said bosses and the adjacent edge of the rim, as shown most clearly in Fig. 1. Thus when the parts are assembled the alarm attachment will be securely held on the wheel, whether the tire be inflated or collapsed.

The alarm attachment may be located at any part of the rim of the wheel, but preferably located opposite the air valve W, as shown in Fig. 4, not only to balance the weight of the parts, but also to provide a more symmetrical arrangement.

In assembling the device, the parts of the alarm apparatus shown in Fig. 2 are inserted in the tire casing, except that the cartridge chamber Q and the nut T carrying the washer $S'$ and gasket S are removed from the housing E; and the screw cap U is screwed on, to which cap is attached a cord or chain V. This cord or chain is rove through the opening in the wheel rim and the flange of the disk, thus serving to guide said housing toward the hole in the rim, and the stem of the housing is drawn up through said hole, as indicated in Fig. 4. The tire and rim are shown in dotted lines in Fig. 4. But, this device for guiding the housing may be omitted, if desired, and I do not claim it as a part of my invention.

After the stem of the housing has been properly located, the tire is inflated to a pressure above the minimum desired, the screw cap U is taken off, and the nut T is screwed over the portion $e^6$ of the housing until the alarm apparatus is firmly held in the position shown in Figs. 2 and 3. When the pressure on the inner tube exceeds the predetermined minimum limit, the device may be armed by simply pressing inwards on the pin $p$ until the tapered shoulder $p^2$ passes beyond the balls; then if the pressure inwards on the pin is released, the pressure of the spring N will cause the shoulder $p^2$ to wedge the balls K outwards, holding the firing pin in the armed position as shown in Fig. 2.

As soon as the pressure in the inner tube falls below the predetermined limit, the force of the spring will move the bell M inwards, releasing the balls from engagement with the tapered face $m'$ of the bell, and these balls will be wedged outwards, under the action of the tapered shoulder $p^2$, into the annular channel between the face $m^2$ and the ring J, permitting the free outward movement of the plunger P under the action of the spring N.

It will be noted that the pneumatic pressure on the inner tube presses the bell outwards, and that the bell is pressed inwards under the action of the spring N. By selecting a spring of the desired strength the apparatus may be adjusted, within limits, to signal when any predetermined minimum pressure has been attained in the inner tube. Thus, I have indicated two kilograms of pressure as the minimum pressure which should be permitted, but obviously a minimum pressure larger than this may be provided for by increasing the power of the spring N.

It will be seen that a single spring serves to actuate the means for locking the plunger in the armed position and for releasing said plunger when the pressure falls below a predetermined limit. When the plunger is released it will fly outwards, exploding the cartridge and signaling to the chauffeur or driver that one of the tires is partially deflated.

It will be noted that with this arrangement the length of the spring, and the large surface of the elements, subject to the pressure of the inner tube to hold the plunger cocked, or to release it, permit the attaining of great accuracy in the minimum pressure in the inner tube. Moreover, a very small movement of the diaphragm is required in either the cocking or releasing operation.

It will be noted that the housing E is closed itself, and is completely enclosed, thus protecting the parts from dust, rust, water, or other deteriorating causes which might impair or prevent the operation of the device.

It will also be noted that in case of a blow-out the alarm apparatus will hold the tire casing on the rim and prevent same from being stripped from the rim. This is especially important when traveling at high speed, or traveling any length of time on a deflated tire.

It will be obvious that various modifications might be made in the herein described device, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a diaphragm closing said upper end and normally pressed upon by the inner tube of the tire, a bell slidably mounted in said chamber and normally engaging said diaphragm, a plunger slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, and a crown of balls adapted to be wedged between said flaring mouth and said tapered shoulder when the pneumatic pressure exceeds the spring pressure, but to be released when the pneumatic pressure falls below the spring pressure, and means actuated by the release of said plunger for sounding an alarm.

2. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a diaphragm closing said upper end and normally pressed upon by the inner tube of the tire, a bell slidably mounted in said chamber and normally engaging said diaphragm, a plunger slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, a ring wedge-shaped in cross section mounted in the base of said chamber, and a crown of balls supported on said ring and adapted to be wedged between said flaring mouth and said tapered shoulder and said ring when the pneumatic pressure exceeds the spring pressure, but to be released when the pneumatic pressure falls below the spring pressure, and means actuated by the release of said plunger for sounding an alarm.

3. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a diaphragm closing said upper end and normally pressed upon by the inner tube of the tire, a bell slidably mounted in said chamber and normally engaging said diaphragm, a plunger provided with a firing pin slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, and a crown of balls adapted to be wedged between said flaring mouth and said tapered shoulder when the pneumatic pressure exceeds the spring pressure, but to be released when the pneumatic pressure falls below the spring pressure, with a cap provided with a cartridge chamber detachably connected to the lower end of said housing, and adapted to hold a cartridge in the path of the firing pin, the said cartridge closing the opening through the lower end of said housing.

4. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a diaphragm closing said upper end and normally pressed upon by the inner tube of the tire, a bell slidably mounted in said chamber and normally engaging said diaphragm, a plunger provided with a firing pin slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, a ring wedge-shaped in cross section mounted in the base of said chamber, and a crown of balls supported on said ring and adapted to be wedged between said flaring mouth and said tapered shoulder and said ring when the pneumatic pressure exceeds the spring pressure, but to be released when the pneumatic pressure falls below the spring pressure, with a cap provided with a cartridge chamber detachably connected to the lower end of said housing, and adapted to hold a cartridge in the path of the firing pin, the said cartridge closing the opening through the lower end of said housing.

5. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a diaphragm closing said upper end and normally pressed upon by the inner tube of the tire, a bell slidably mounted in said chamber and normally engaging said diaphragm, means for securing said housing in place comprising a clamp piece held between said housing and the beads of the tire, and a nut mounted on said housing on the inside of the rim of the wheel, a plunger slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, and a crown of balls adapted to be wedged between said flaring mouth and said tapered shoulder when the pneumatic pressure exceeds the spring pressure, but to be released when the pneumatic pressure falls below the spring pressure, and means actuated by the release of said plunger for sounding an alarm.

6. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially preforated, a bell slidably mounted in said chamber, a plunger slidably mounted in said housing and also slidably mounted in said bell, a coil spring mounted in said plunger and normally pressing the plunger in one direction and the bell in the other direction, the said bell being provided with a flaring mouth, and the said plunger being provided wth an exterior tapered shoulder, and a crown of balls adapted to be wedged between said flaring mouth and said tapered shoulder when the pneumatic pressure exceeds the spring pressure, but to be released when the pneumatic pressure falls below the spring pressure, and means actuated by the release of said plunger for sounding an alarm.

7. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a bell slidably mounted in said chamber, a plunger slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, a ring wedge-shaped in cross section mounted in the base of said chamber, and a crown of balls supported on said ring and adapted to be wedged between said flaring mouth and said tapered shoulder and said ring when the pneumatic pressure exceeds the spring pressure, but to be released when the penumatic pressure falls below the spring pressure, and means actuated by the release of said plunger for sounding an alarm.

8. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a bell slidably mounted in said chamber, a plunger provided with a firing pin slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, and a crown of balls adapted to be wedged between said flaring mouth and said tapered shoulder when the pneumatic pressure exceeds the spring pressure, but to be released when the pneumatic pressure falls below the spring pressure, with the cartridge chamber connected to said housing adapted to contain a cartridge.

9. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a bell slidably mounted in said chamber, a plunger provided with a firing pin slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, and a crown of balls adapted to be wedged between said flaring mouth and said tapered shoulder when the pneumatic pressure exceeds the spring pressure, but to be released when the pneumatic pressure falls below the spring pressure, with a cap provided with a cartridge chamber detachably connected to the lower end of said housing, and adapted to hold a cartridge, in the path of the firing pin, the said cartridge closing the opening through the lower end of said housing.

10. An automatic alarm for indicating when the pressure in the inner tube of a pneumatic tire falls below a predetermined limit, comprising a housing having its upper end projecting into the interior of the tire casing between the beads, and its lower end projecting through the rim of the wheel, the upper end being open and provided with an enlarged chamber, and the lower end being axially perforated, a bell slidably mounted in said chamber, means for securing said housing in place comprising a clamp piece held between said housing and the beads of the tire, and a nut mounted on said housing on the inside of the rim of the wheel, a plunger slidably mounted in said housing and also slidably mounted in said bell, a coil spring mounted in said plunger and normally pressing the plunger in one direction and the bell in the other direction, the said bell being provided with a flaring mouth, and the said plunger being provided with an exterior tapered shoulder, and a crown of balls adapted to be wedged between said flaring mouth and said tapered shoulder when the pneumatic pressure exceeds the spring pressure, but to be released when the pneumatic pressure falls below the spring pressure, with means actuated by said plunger from making an audible signal.

ANDRÉ JULES MICHELIN.